(12) United States Patent
Choi et al.

(10) Patent No.: US 10,995,852 B2
(45) Date of Patent: May 4, 2021

(54) SYSTEMS AND METHODS FOR CONTROLLING FRICTION ELEMENTS

(71) Applicant: Ford Global Technologies, LLC, Dearborn, MI (US)

(72) Inventors: Jaewon Choi, Northville, MI (US); Stephen Michael Cicala, Dearborn Heights, MI (US); Bradley D Riedle, Northville, MI (US); Eric Frank Banners, Plymouth, MI (US); Cory Benson Laroche, Commerce Township, MI (US); Kurt Howard Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 16/431,182

(22) Filed: Jun. 4, 2019

(65) Prior Publication Data

US 2020/0386279 A1 Dec. 10, 2020

(51) Int. Cl.
*F16H 61/06* (2006.01)
*F16D 48/02* (2006.01)
*F16D 48/06* (2006.01)
*B60W 10/02* (2006.01)

(52) U.S. Cl.
CPC .......... *F16H 61/061* (2013.01); *F16D 25/14* (2013.01); *F16D 48/066* (2013.01); *B60W 10/02* (2013.01); *F16D 2500/70406* (2013.01); *F16H 2061/062* (2013.01)

(58) Field of Classification Search
CPC ...... F16H 1/06–2061/062; F16D 48/08; F16D 48/066
See application file for complete search history.

(56) References Cited

U.S. PATENT DOCUMENTS

| | | | |
|---|---|---|---|
| 6,176,811 B1 * | 1/2001 | Popp | F16H 61/061 477/115 |
| 6,772,869 B2 * | 8/2004 | Shiohara | B60T 13/66 192/109 F |
| 6,994,647 B2 | 2/2006 | Cicala et al. | |
| 7,056,263 B2 | 6/2006 | Whitton | |
| 7,798,940 B2 * | 9/2010 | Henning | F16D 48/066 477/174 |
| 8,246,514 B2 | 8/2012 | Hayashi | |
| 8,744,705 B2 | 6/2014 | Thor | |
| 9,746,074 B2 * | 8/2017 | Kitazawa | B60W 10/06 |

* cited by examiner

*Primary Examiner* — Ernesto A Suarez
*Assistant Examiner* — James J Taylor, II
(74) *Attorney, Agent, or Firm* — Vincent Mastrogiacomo; Brooks Kushman P.C.

(57) ABSTRACT

A vehicle includes a transmission having a plurality of friction elements selectively engageable to establish power flow paths within the transmission. A controller of the vehicle is programmed to, during a boost phase of a shift, command a first hydraulic boost pressure for a plurality of control loop cycles to an oncoming one of the friction elements (oncoming friction element) and subsequently command a second hydraulic boost pressure less than the first hydraulic boost pressure for only a single control loop cycle that defines an end of the boost phase to the oncoming friction element.

19 Claims, 5 Drawing Sheets

SYSTEMS AND METHODS FOR CONTROLLING FRICTION ELEMENTS

TECHNICAL FIELD

The present disclosure relates to systems and methods for controlling friction elements and more specifically to controlling fluid flow rates during a boost phase of friction element engagement.

BACKGROUND

A clutch is a device that selectively locks two or more components for synchronized rotation. The clutch may be used to selectively lock a pair of rotating components or may be used to selectively ground a rotating component to a fixed component. One type of clutch is a hydraulic clutch that engages and disengages based on pressurized oil supplied to a piston chamber.

A common application for hydraulic clutches is in multiple step-ratio automatic transmissions. The clutches and brakes of the transmission selectively hold components of planetary gear sets to establish and disestablish power flow paths through the transmission. Hydraulic clutches can also be used within the vehicle driveline. For example, a disconnect clutch may be used to selectively couple an engine to an electric machine.

SUMMARY

According to one embodiment, a vehicle includes a transmission having a plurality of friction elements selectively engageable to establish power flow paths within the transmission. A controller of the vehicle is programmed to, during a boost phase of a shift, command a first hydraulic boost pressure for a plurality of control loop cycles to an oncoming one of the friction elements (oncoming friction element) and subsequently command a second hydraulic boost pressure less than the first hydraulic boost pressure for only a single control loop cycle that defines an end of the boost phase to the oncoming friction element.

According to another embodiment, a hybrid vehicle includes an engine, an electric machine, and a disconnect clutch configured to selectively couple the engine to the electric machine. A vehicle controller is programmed to, responsive to a request to engage the clutch, sequentially command, during a boost phase of clutch engagement, a first hydraulic boost pressure to the clutch for a first duration of time and a second hydraulic boost pressure to the clutch for a second duration of time, and, responsive to the end of the boost phase, command a hysteresis pressure to the disconnect clutch.

According to yet another embodiment, a method of controlling hydraulic pressure commanded to a friction element of a vehicle includes, in response to a request to engage the friction element and being in a boost phase, commanding fluid to the friction element at a first flow rate for a plurality of control loop cycles and subsequently commanding the fluid to the friction element at a second flow rate for only a single control loop cycle that defines an end of the boost phase.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
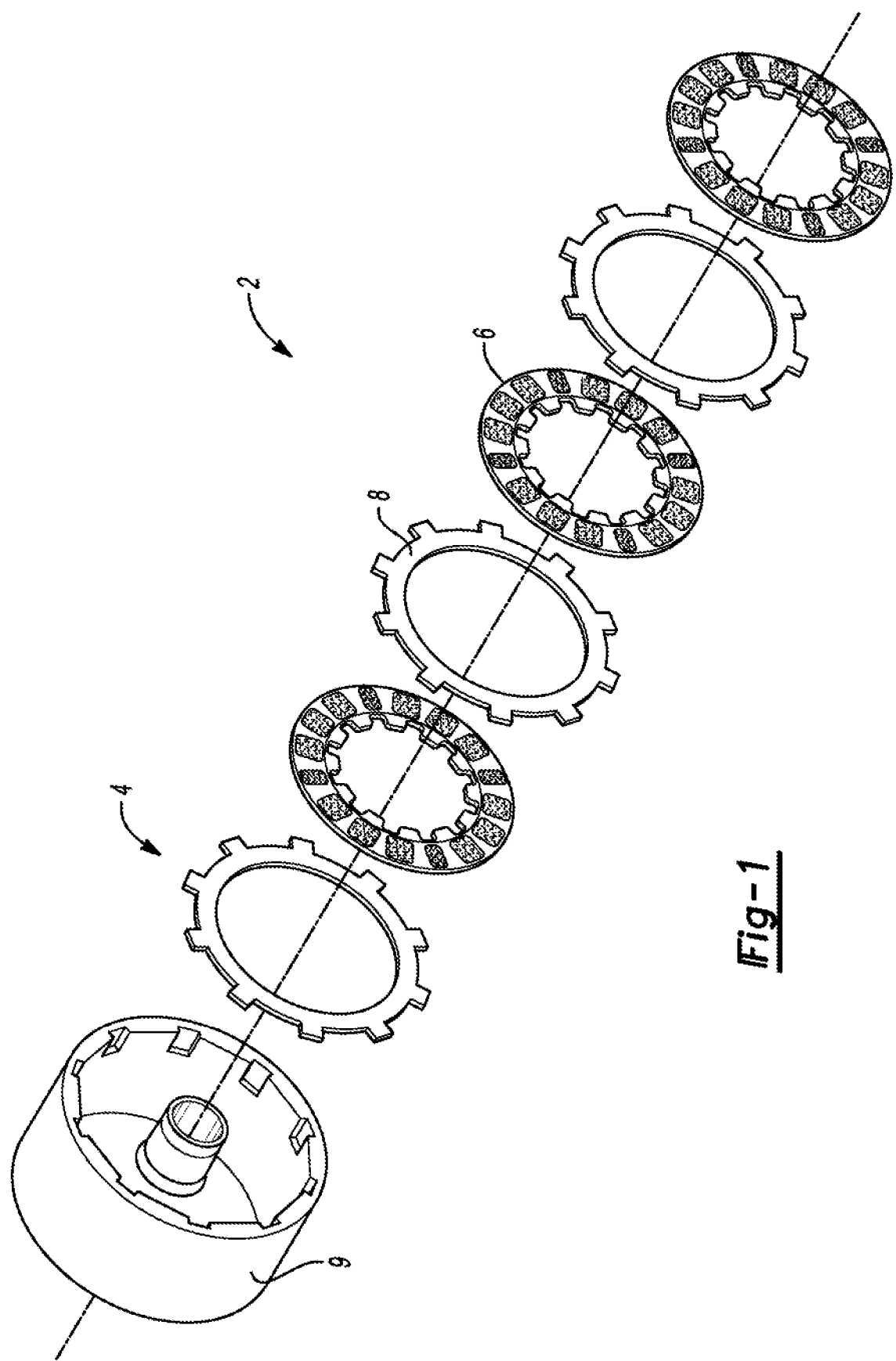
FIG. 1 is an exploded perspective view of friction element simplified for illustrative purposes.

Referring to FIG. 1, a hydraulic friction element 2 is a device configured to selectively couple two or more components according to fluid pressure supplied to the clutch. The friction element 2 may be a clutch. A clutch that holds a component against rotation by selectively connecting the component to a housing may be called a brake. Used herein, the term "clutch" is generic and includes clutches and brakes.

The friction element 2 may include at least one clutch pack 4 having a plurality of friction plates 6 (also known as clutch plates, etc.) and a plurality of pressure plates 8 (also known as steel plates, bands, etc.). The friction plates 6 are interleaved with the pressure plates 8 and alternate along a length of the pack 4. The friction plates 6 are rotationally fixed to a first component and the pressure plates 8 are rotationally fixed to a second component. The friction element 2 is configured to rotationally couple the first and second components to each other when the clutch is fully engaged. For example, the pressure plates 8 may include fingers that spline with grooves defined in a drum 9, and the friction plates 6 may include teeth that spline with grooves defined in a shaft or other component (not shown). An actuator (not shown) is configured to compress the clutch pack 4 to engage or slip the friction element 2 and release the clutch pack 4 to disengage the friction element 2. The actuator may include a hydraulically actuated piston and drive plate that are adjacent to the clutch pack 4. Engagement of the friction element 2 generally includes a stroke phase (also known as boost phase) in which the piston is readied for generating clutch capacity and a torque-transfer phase where the clutch builds capacity. During the boost phase, the piston is moved from a retracted position towards the clutch pack 4 so that the piston will quickly compress the clutch pack 4 when clutch capacity is demanded. The piston may be stroked by supplying oil into a chamber associated with the clutch. As oil fills the chamber, the piston is moved, i.e., stroked, towards the clutch pack 4.

Figure 2:
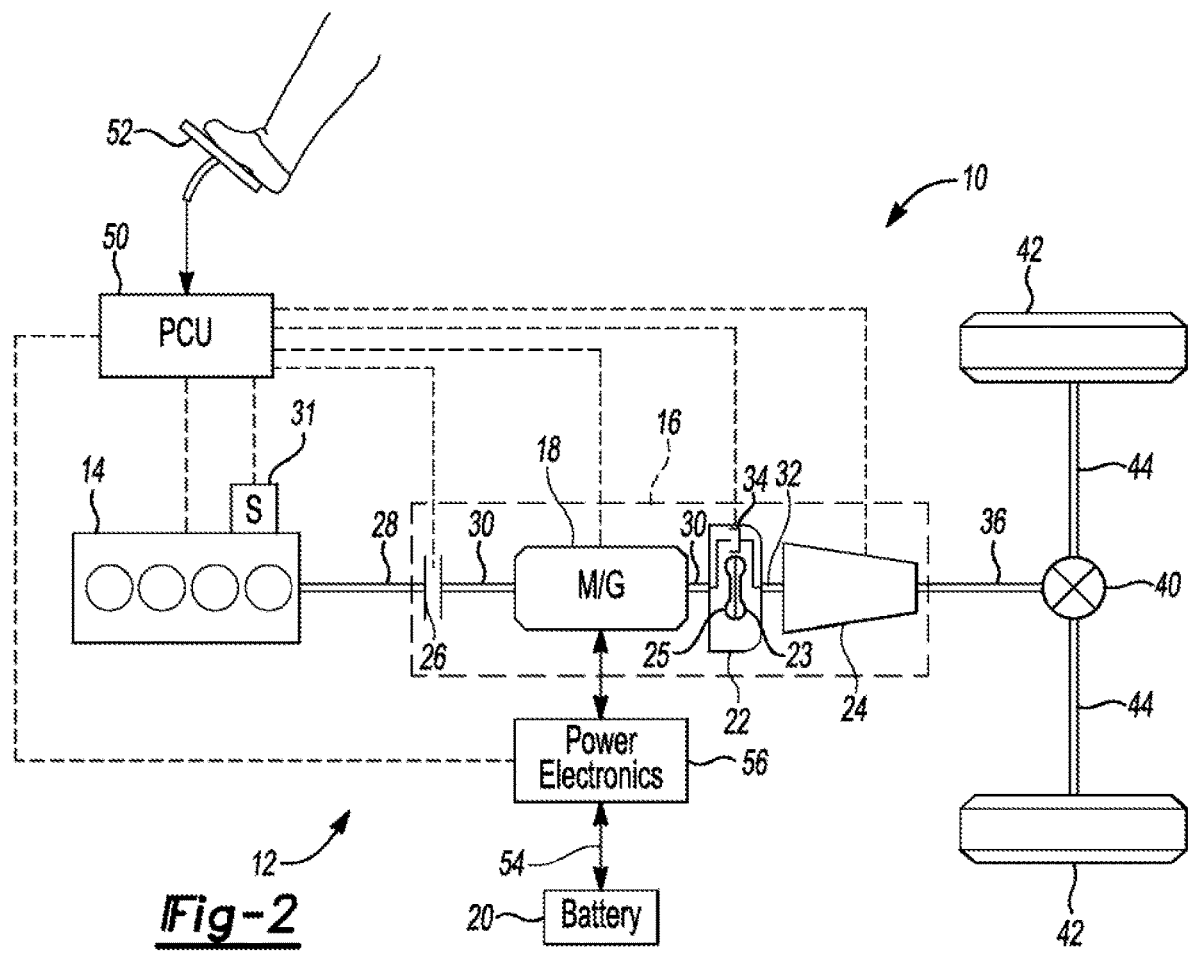
FIG. 2 is a schematic of a hybrid electric vehicle according to one embodiment.

Referring to FIG. 2, a schematic diagram of a hybrid electric vehicle (HEV) 10 is illustrated according to an embodiment of the present disclosure. FIG. 2 illustrates representative relationships among the components. Physical placement and orientation of the components within the vehicle may vary. The HEV 10 may include one or more hydraulic clutches for performing various functions. The HEV 10 includes a powertrain 12. The powertrain 12 includes an engine 14 that drives a transmission 16, which may be referred to as a modular hybrid transmission (WIT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic gearbox 24 are connected sequentially in series, as illustrated in FIG. 2. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26, e.g., a hydraulic clutch, between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three-phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 25 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step-drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have ten speeds including first through tenth gears. In this example, tenth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 2, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controller 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 2 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 3:
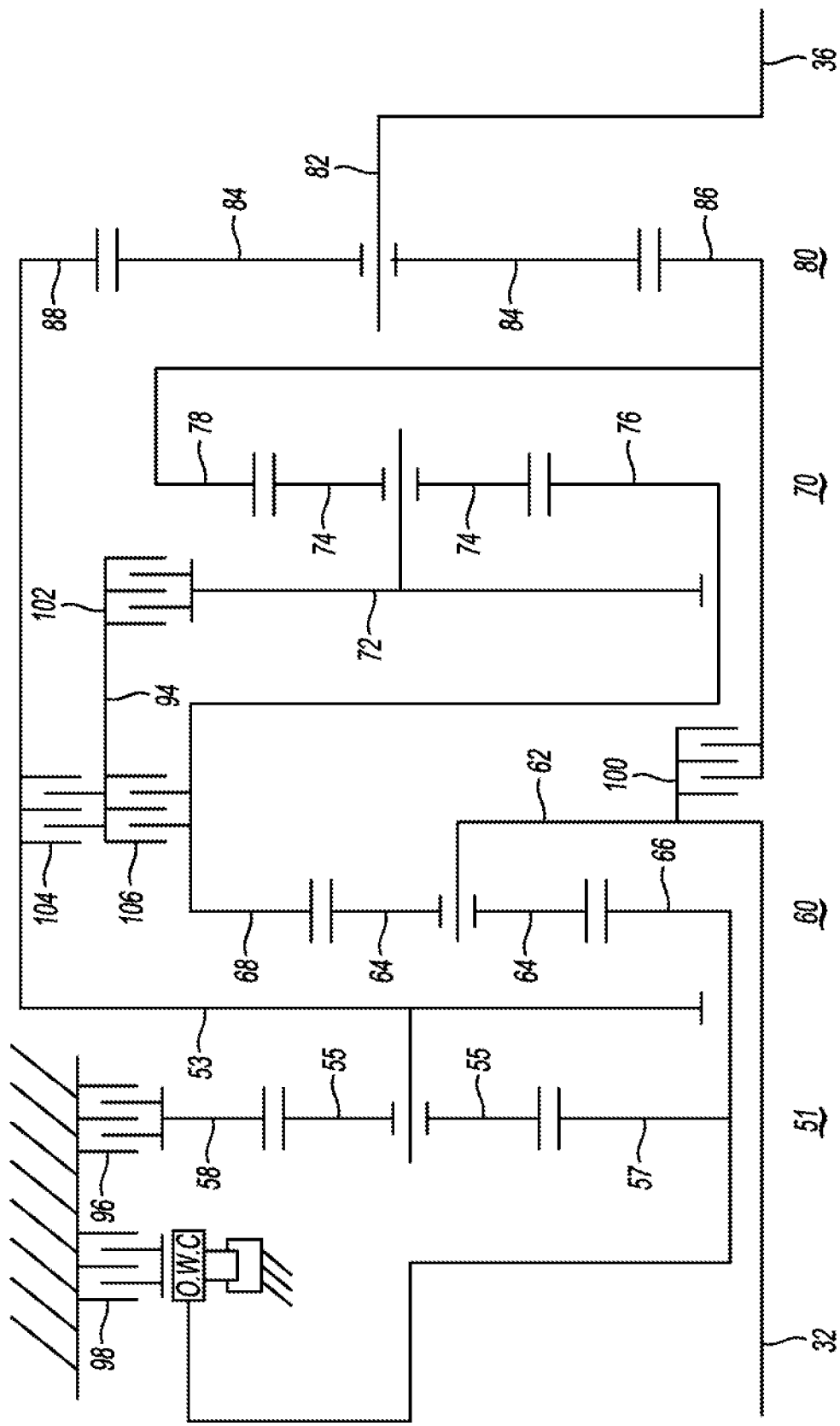
FIG. 3 is a stick diagram of a gearbox of the vehicle of FIG. 2.

The example gearbox 24 is schematically illustrated in FIG. 3. While the gearbox 24 is described as being part of a hybrid transmission 16, the gearbox 24 may be used in a convention, engine-powered powertrain. The illustrated gearbox 24 is a ten speed, but this is just an example, and the gearbox 24 may be a six speed, an eight speed, etc. The gearbox 24 includes a gearing arrangement configured to modify a speed/torque relationship between an input shaft 32 and an output shaft 36. A gearing arrangement is a collection of rotating elements and friction elements configured to impose specified speed relationships among the rotating elements. Some speed relationships, called fixed speed relationships, are imposed regardless of the state of any friction elements. Other speed relationships, called selective speed relationships, are imposed only when particular friction elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction.

Some of the rotating elements are fixedly coupled to one another whereas other rotating elements are selectively coupled only when select ones of the friction elements are engaged. A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a friction element when the friction element constrains them to rotate as a unit whenever the friction element is fully engaged and they are free to rotate at distinct speeds in at least some other operating condition. Friction elements may be actively controlled devices such as hydraulically or electrically actuated clutches or brakes or may be passive devices such as one-way clutches or brakes. Two rotating elements are coupled if they are either fixedly coupled or selectively coupled.

The gearbox 24 may utilize four simple planetary gear sets 51, 60, 70, and 80. A simple planetary gear set is a type of fixed gearing arrangement. A planet carrier 53 rotates about a central axis and supports a set of planet gears 55 such that the planet gears rotate with respect to the planet carrier. External gear teeth on the planet gears mesh with external gear teeth on a sun gear 57 and with internal gear teeth on a ring gear 58. The sun gear and ring gear are supported to rotate about the same axis as the carrier. A simple planetary gear set imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 60, 70, and 80 are similarly structured.

An example ratio of gear teeth for each planetary gear set is listed in Table 1.

TABLE 1

| Ring 58/Sun 57 | 2.20 |
| Ring 58/Sun 57 | 1.75 |
| Ring 58/Sun 76 | 1.60 |
| Ring 58/Sun 86 | 3.70 |

In the example transmission of FIG. 3, sun gear 57 is fixedly coupled to sun gear 66, carrier 53 is fixedly couple to ring gear 88, ring gear 68 is fixedly coupled to sun gear 76, ring gear 78 is fixedly coupled to sun gear 86, input shaft 90 is fixedly coupled to carrier 62, and output shaft 92 is fixedly coupled to carrier 82. Ring gear 58 is selectively held against rotation by clutch 96, and sun gears 57 and 66 are selectively held against rotation by clutch 98. Input shaft 90 is selectively coupled to ring gear 78 and sun gear 86 by clutch 100. Intermediate shaft 94 is selectively coupled to carrier 72 by clutch 102, selectively coupled to carrier 53 and ring gear 88 by clutch 104, and selectively coupled to ring gear 68 and sun gear 76 by clutch 106.

As shown in Table 2, engaging the clutches in combinations of four establishes ten forward speed ratios and one reverse speed ratio between input shaft 90 and output shaft 92. An X indicates that the clutch is required to establish the speed ratio. An (X) indicates the clutch can be applied but is not required. In first gear, either clutch 104 or clutch 106 can be applied instead of applying clutch 102 without changing the speed ratio. When the gear sets have tooth numbers as indicated in Table 1, the speed ratios have the values indicated in Table 2.

TABLE 2

|     | 96 | 98 | 100 | 102 | 104 | 106 | Ratio | Step |
| --- | --- | --- | --- | --- | --- | --- | --- | --- |
| Rev | X | X |   | X | X |   | −4.79 | 102% |
| 1st | X | X | X | (X) |   |   | 4.70 |   |

TABLE 2-continued

| | 96 | 98 | 100 | 102 | 104 | 106 | Ratio | Step |
|---|---|---|---|---|---|---|---|---|
| 2nd | X | X | | X | | X | 2.99 | 1.57 |
| 3rd | X | | X | X | | X | 2.18 | 1.37 |
| 4th | X | | | X | X | X | 1.80 | 1.21 |
| 5th | X | X | | | X | X | 1.54 | 1.17 |
| 6th | X | | X | X | X | | 1.29 | 1.19 |
| 7th | | | X | X | X | X | 1.00 | 1.29 |
| 8th | | X | X | X | X | | 0.85 | 1.17 |
| 9th | | X | X | | X | X | 0.69 | 1.24 |
| 10th | | X | | X | X | X | 0.64 | 1.08 |

The gearbox 24 includes a hydraulic circuit for controlling the friction elements. The hydraulic circuit may use oil, e.g., automatic transmission fluid, as the working fluid. The clutches are engaged by supplying pressurized oil to the clutches and are disengaged by reducing the oil pressure. By varying the magnitude of the pressurized oil, the capacity (torque) of the clutches can be increased and decreased. The hydraulic circuit is controlled by the controller 50 and is responsible for switching between the various gears of the transmission.

Figure 4:
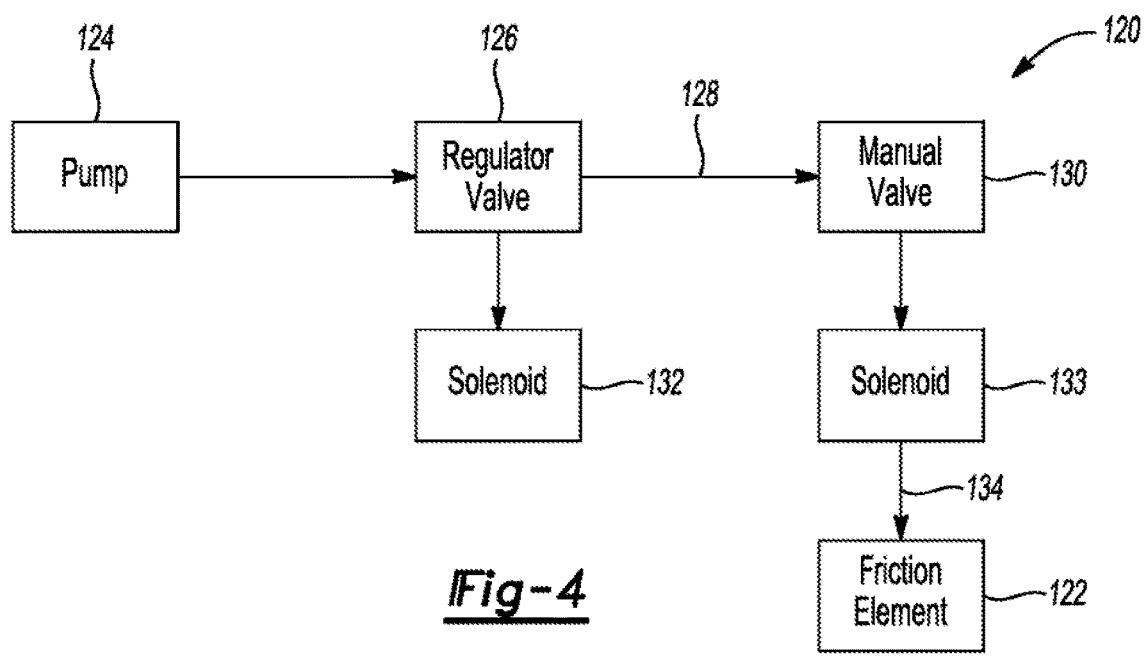
FIG. 4 is a schematic of a hydraulic circuit for operating a friction element.

Referring to FIG. 4, an example schematic of a simplified hydraulic circuit 120 for a friction element 122 is shown. The gearbox 24 may include a more complex version of the hydraulic circuit 120, but this simple schematic illustrates the concept. The disconnect clutch 26 may also be controlled by a hydraulic circuit, which may be plumbed with the hydraulic circuit that controls the gearbox 24. The hydraulic circuit 120 is controlled by a controller such as controller 50. The hydraulic circuit 120 includes an oil pump 124 that may be mechanically powered by the engine or may be electric. Some circuits may have multiple pumps. The oil pump 124 feeds pressurized oil to a regulator valve 126. The regulator valve 126 regulates the pressure received from the pump 124 and outputs a line pressure 128 to a manual valve 130. The regulator valve 126 is actuated by a solenoid 132. Another solenoid 133, associated with friction element 122, introduces the line pressure through the manual valve 130 and, after regulating the pressure, provides the regulated pressure 134 to the friction element 122. The controller increases and decreases the regulated pressure 134 to actuate the friction element 122 as desired. The regulated pressure 134 may be increased by opening the solenoid 133 and may be decreased by closing the solenoid 133. The size of the opening of the solenoid 132 may be modified by changing a current sent to the solenoid 133. The controller may include one or more lookup tables correlating regulated pressure to electric current. The controller may command the regulated line pressure by commanding a current to the solenoid 133.

The friction element 122 has at least a boost phase in which the piston is stroked, a torque transfer phase where the clutch builds capacity, and a locked phase where slip ends. During the boost phase, a chamber associated with the piston is filled with oil and is not yet under much pressure. During the boost phase, one or more hydraulic boost pressures may be commanded. "Hydraulic boost pressure" refers to a pressure commanded to an engaging friction element during the boost phase. That is, hydraulic boost pressure does not refer to hydraulic pressures commanded outside of the boost phase such as the boost-prime phase, the torque transfer phase, etc.

A duration of the boost phase (boost time) can be reduced by increasing the flow rate of oil to the chamber, i.e., filling the chamber faster. The solenoid 133 controls the flow rate of the oil by increasing and decreasing an opening of the solenoid. Rather than directly commanding a flow rate to the solenoid 133, the control logic may use command pressures to the solenoid to increase or decrease flow rate. The controller may include lookup tables that map commanded pressure to opening size. Thus, the flow rate may be increased by commanding a higher pressure and decreased by commanding a lower pressure. To reduce the boost time, the controller may command a pressure corresponding to the fully open position of the solenoid 133. To prevent overstroking the piston, a second, lower pressure (trim pressure) may be commanded towards the end of the boost phase to reduce the flow rate and reduce the likelihood of generating clutch capacity prematurely. This will be described in more detail below.

Referring back to FIG. 3, the controller 50 is programmed with one or more shift schedules for the gearbox 24. The shift schedule maps transmission shift points with a variety of factors such as engine speed and accelerator pedal position. The shift schedule includes upshifts where the transmission shifts from a lower gear to a higher gear, e.g., shifting from first gear to second gear, and downshifts where the transmission shifts from a higher gear to a lower gear, e.g., shifting from third gear to second gear. During a shift, one of the engaged clutches (offgoing clutch) is released and one of the disengaged clutches (oncoming clutch) is engaged in a synchronized manner to ensure a smooth transition. In an example six-seven upshift the oncoming clutch 106 is engaged and the offgoing clutch 96 is disengaged, and in an example seven-six downshift the offgoing clutch 106 is disengaged and the oncoming clutch 96 is engaged. If the synchronization is incorrect engine flare or transmission tie-up may occur.

Figure 5:
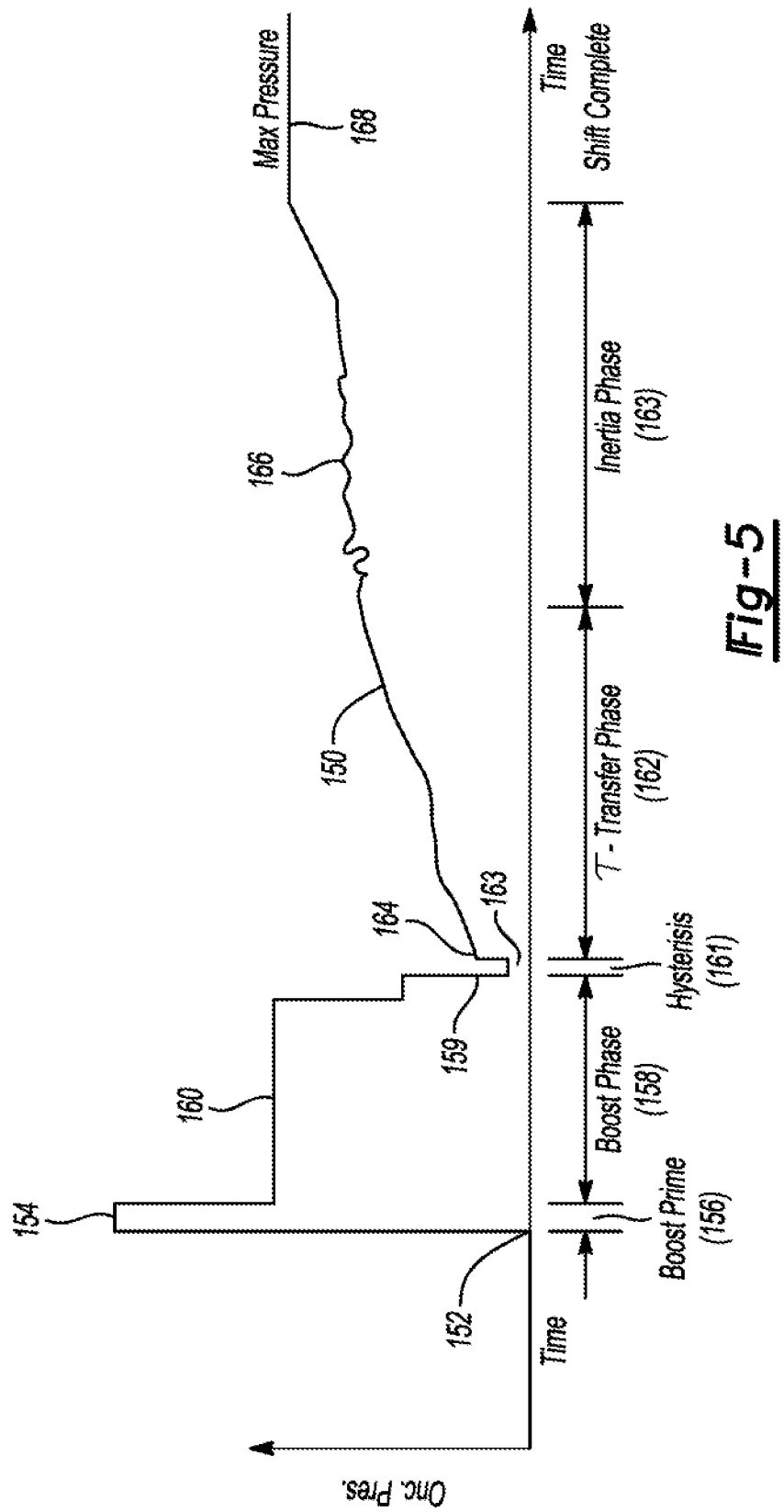
FIG. 5 is a time plot of hydraulic pressures commanded to a solenoid associated with an oncoming friction element during an upshift of a transmission.

FIG. 5 illustrates an example upshift of the gearbox 24. The x-axis is time and the y-axis is fluid pressure 150 commanded to the solenoid associated with the oncoming clutch (not actual fluid pressure acting on the clutch pack). At time 152, the solenoid is primed by commanding a priming pressure 154 during a boost-prime phase 156 of the upshift. A boost phase 158 proceeds the priming phase 156. (In some embodiments, the boost-prime phase may be part of the boost phase where the commanded pressure are the same.) During the boost phase 158, the oncoming clutch is filled with oil to stroke the piston placing the oncoming clutch in condition for subsequent engagement. The boost phase ends at point 159 where the controller commands the fluid pressure to a regulation pressure that holds the piston stroked while not creating clutch capacity. The hydraulic boost pressure (boost pressure) 160 during the boost phase may be less than the priming pressure 154. During the boost phase 158, the offgoing clutch pressure is gradually reduced so that at the end of the boost phase 158 the capacity of the offgoing-clutch is sufficient only to maintain fluid pressure until the beginning of the torque-transfer phase 162 in which the actual shifting begins. A hysteresis 161 follows the boost phase 158. During hysteresis 161, a hysteresis pressure 163 is commanded. The commanded hysteresis pressure 163 is substantially less than the pressures commanded during the boost phase 158. The commanded hysteresis pressure 163 may be zero.

Torque transfer from the offgoing clutch to the oncoming clutch (torque-transfer phase 162) begins at point 164 following hysteresis 161. The pressure commanded to the oncoming clutch is increased, simultaneously with a decreased pressure command to the offgoing clutch. After the torque transfer is complete, the inertia phase 163 begins. During the inertia phase 163, the clutches slip as pressure on the oncoming clutch is controlled using a closed-loop controller such as a proportion-integral-derivative (PID) controller, which results in the trace shown at 166. After the closed-loop control ends, the pressure on the oncoming clutch is ramped up as shown at 168 and the offgoing clutch pressure is decreased to its release value. At this point, the upshift is complete. A similar process may be used to engage the disconnect clutch 26, minus the inertia phase and controls for an offgoing clutch.

Vehicle acceleration can be improved by reducing transmission upshift times. Shift time can be reduced by reducing one or more of the above described phases of an upshift such as the boost phase 158 or the torque-transfer phase 162. Reducing the duration of the torque-transfer phase 162 may affect shift quality, e.g., a harder engagement. Reducing the boost time, however, can be done without affecting shift quality as long as the piston does not become over-stroked, i.e., no clutch capacity during the boost phase. The vehicle may be configured to generally have reduced shift times, or may employ a strategy that reduces shift times when in a certain mode, such as sport mode.

The boost time may be reduced by increasing the oil flow rate to the clutch by increasing the opening of the solenoid to fill the clutch faster. But, increasing the opening of the solenoid also increases the chances of over-stroking the piston during the boost phase leading to unwanted clutch engagement, e.g., transmission tie-up. Therefore, precise control of the solenoid during the boost phase is required when attempting to minimize the boost time to reduce overall shift time.

One challenge of controlling oil flow rates during the boost phase is the cycle speed (also known as task rate) of the controller. The controller has a control loop that executes at a predefined cycle time, e.g., 10 milliseconds (ms). That is, the controller completes a logic loop every 10 ms. The opening of the solenoid can only be changed once every control loop, e.g., every 10 ms. If the ideal duration of the boost phase is a multiple of the cycle time, this is not problematic, but, in many instances, the ideal duration will not be divisible by the cycle time without remainder. For example, if a desired boost time is 85 ms and the cycle time is 10 ms, the controller cannot reduce the oil flow rate at 85 ms and instead must wait until 90 ms to reduce the oil flow rate. This, however, may result in over-stroking the piston. On the other hand, the controller could reduce the flow rate at 80 ms, but this may not fully stroke the piston leading to longer shift times. This problem can be overcome by increasing the speed of the controller, e.g., 1 ms cycle time, but this requires more computing power and therefore increases costs.

The following controls and methods overcome limitations in controller cycle times without requiring increased computing power in order to deliver shortened boost phases without increasing cost.

Traditionally, constant pressures were commanded during the boost phase. These pressures were lower such that waiting until the next control loop to end the boost-pressure command did not result in the generation of clutch capacity. In order to reduce boost time, the systems and methods of this disclosure are commanding much higher boost pressures such that waiting until the next control loop to take action is not feasible. To overcome the above-described controller speed constraints, a multi-pressure boost phase is employed. A multi-pressure boost phase may command a high pressure, which results in wide open throttle of the solenoid, from the beginning of the boost phase until the last control loop of the boost phase, and command at least one lower pressure (trim pressure) for the last control loop. The lower pressure(s) allows the piston to fully stroke without generating capacity in the clutch.

In the following examples, the multi-pressure boost phase will be described as having only two different pressures, e.g., first and second hydraulic boost pressures, but third or even fourth hydraulic boost pressures may be used in some embodiments.

Figure 6:
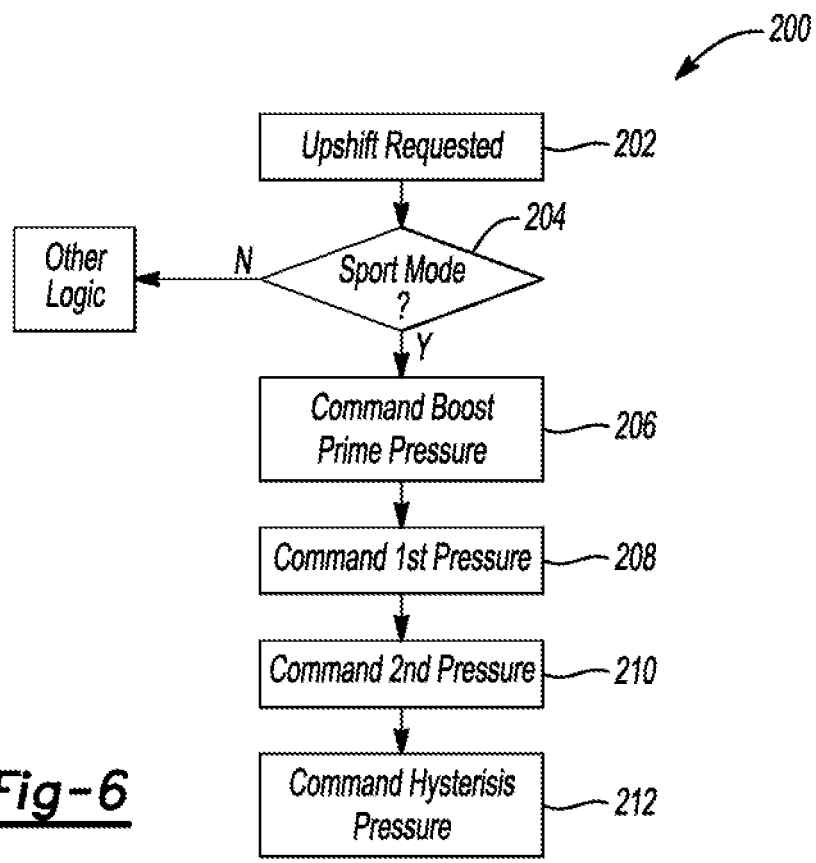
FIG. 6 is a flow chart for operating a solenoid during a boost phase of a transmission upshift.

FIG. 6 is a flow chart 200 for controlling boost pressure during a shift. In the illustrated embodiment, the shift is an upshift, but the flow chart 200 may also be used with a downshift. At operation 202 an upshift request is received. At operation 204, the controller determines if the vehicle is in sport mode. If no, other logic is used. If yes, control passes to operation 206. (Operation 204 is optional.) At operation 206, the controller initiates the boost-prime phase by commanding a boost-prime pressure to the solenoid associated with the oncoming clutch. After the boost-prime phase ends, control passes to operation 208 and a first hydraulic boost pressure is commanded to the solenoid associated with the oncoming clutch. The first hydraulic boost pressure may be a pressure that results in fully opening the solenoid or may be some lesser opening. The first boost pressure is a calibrated value that is determined during vehicle testing and is a function of the hardware of the clutch and associated components. The controller may include one or more lookup tables that map first pressures to various clutches and brakes of the transmission. For example, each clutch may include a sport-mode first boost pressure and a normal-mode first boost pressure. Alternatively, the clutches may only include a single first boost pressure.

The first pressure is commanded for a first predetermined duration of time (first time). The first time is also a calibrated value that may be stored in one or more lookup tables. Each clutch may also have one or more first times saved in memory and used in different driving scenarios such as regular mode or sport mode. (In regular mode, there may only be the first boost pressure, i.e., a constant pressure boost phase.)

After the first time expires, the controller commands a second hydraulic boost pressure (trim pressure) that is less than the first boost pressure at operation 210. The second boost pressure is also commanded for a predetermined duration of time (second time). The second time is shorter than the first time, and in some embodiments may be substantially shorter than the first time. For example, the first time may be ten times longer than the second time. In one or more embodiments, the second time may be for only a single control loop and the first time may be for all of the other control loops of the boost phase. Like the first pressure, the second pressure and the second time are calibrated values that may be stored in lookup tables of the controller. After the boost phase ends, the controller commands a hysteresis pressure at operation 212, typically for one control loop. Following the hysteresis pressure, a regulation pressure (a pressure sufficient to maintain the piston in the stroked position but is insufficient to generate any clutch capacity) may be commanded to begin the torque transfer phase.

The following description explains an example methodology for calibrating the first and second boost pressures and the first and second boost times according to one or more embodiments. The first step in the calibration process is determining an ideal boost time for the clutch. The ideal boost time is based on the first pressure. The ideal boost time may be the shortest boost time possible given the physical constraints of the transmission such as maximum flow rate of the solenoid and volume of the piston chamber. For example, it may take 123.4 ms to stroke the clutch when the solenoid is fully open. Thus, the ideal boost time may be 123.4 ms and the first boost pressure may be a pressure that equates to the wide-open position of the solenoid so that the maximum flow rate of the system is used during the first time. As an example, the first pressure may be 1,200 to 1,500 kilopascals (kPa). This, of course, is merely an example and will vary based on the design of the gearbox.

In an ideal situation, the controller would command maximum flow rate out of the solenoid for 123.4 ms and then command regulation pressure. But as explained above, the cycle time of the typical controller is too coarse for such controls. As such, the next step in the calibration process is to calculate a target boost time for the boost phase. The target boost phase is slightly longer than the ideal and uses a trim pressure to avoid over-stroke of piston.

The target boost time is a value that is a multiple of the cycle time. The target boost time may be calculated by performing integer division with the ideal boost time being the dividend and the cycle time being the divisor. The result of the integer division is an integer quotient and a remainder. The integer quotient is the number of control loops preformed with the first pressure and the remainder is used to calculate the trim pressure. The target boost time may be the integer quotient plus one multiplied by the cycle time. Assuming an ideal boost time of 123.4 ms and the cycle time of 10 ms, the target boost time is 130 ms (13 cycles) and the remainder is 3.4 ms.

The second boost pressure (trim pressure) is a function of the remainder and is based on the target boost time. Equation 1 may be used to calculate the second boost pressure.

$$\text{Trim Pressure} = (P_1 - \text{Offset}) \times (R \times 0.10) + \text{Offset} \quad \text{(Eq. 1)}$$

$P_1$ is the first pressure. R is the remainder in ms. The offset is a reference point used to calculate the trim pressure. The offset is used to prevent the calculated trim pressure from being less than the regulation pressure. (If the trim pressure is less than the regulation pressure, the piston may de-stroke.) The offset is a calibrated value chosen so that, regardless of the remainder, the trim pressure is above the regulation pressure. In some embodiments, the offset may be equal to the regulation pressure, but this leaves less margin for error. In this example, first pressure is 1200 kPa and the offset is 170 kPa. Thus, in this example, the second boost pressure is 520.2 kPa.

Once the target boost time is determined, the first time can be calibrated. The first time may be equal to the total number of cycles in the target boost time minus one then times the cycle time as shown in equation 2. Continuing with the above example, the first time may be for 12 cycles or 120 ms. Of course, the first time may be shorter in other embodiments.

$$\text{First Boost Time} = (\text{total cycles} - 1) \times \text{cycle time} \quad \text{(Eq. 2)}$$

The second time is equal to the total number of cycles minus the number of cycles in the first time. In the above example, the second time is one cycle (13 cycles minus 12 cycles=1 cycle) or 10 ms. In other embodiments, the second pressure may be applied for more than one cycle such as two or three cycles.

Figure 7:
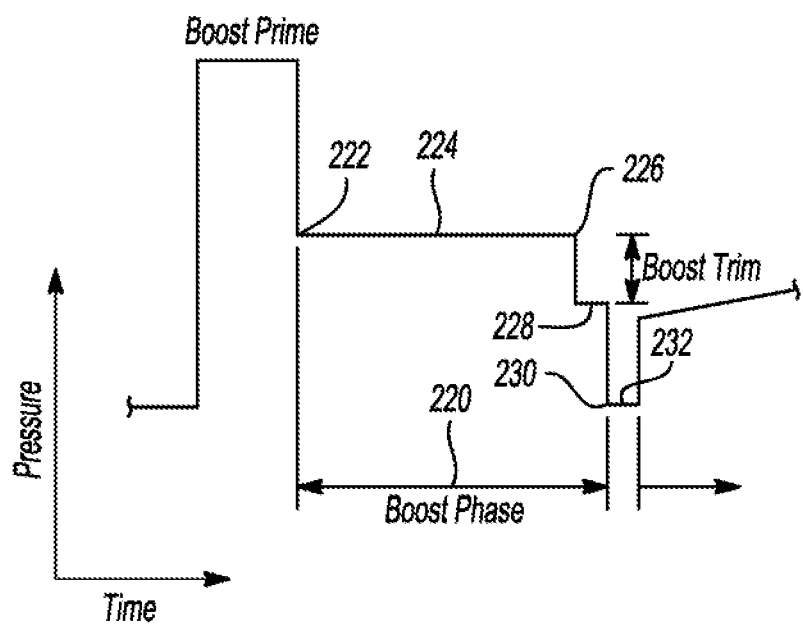
FIG. 7 is a time plot of hydraulic pressures commanded to a solenoid during a boost phase.

FIG. 7 shows plot of a boost phase 220 according to the above-described calibrations. The boost phase 220 begins in response to the boost-prime phase ending. Beginning at point 222, the controller commands a first hydraulic boost pressure 224 to the solenoid associated with the oncoming clutch. The first boost pressure may be 1200 kPa and is commanded for 12 consecutive cycles or 120 ms. The first time ends and the second time begins at point 226. For the thirteenth cycle, the controller commands the second boost pressure 228, which may be 520.2 kPa, for 10 ms. The boost phase ends at point 230 and a hysteresis pressure 232 is commanded briefly before the clutch begins the torque-transfer phase.

By using multiple, different boost pressures during the boost phase, higher flow rates may be used resulting in reduced engagement time of a friction element. These concepts can be used in controlling any type of hydraulic friction element such as the above-described transmission clutches and the disconnect clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a transmission including a plurality of friction elements selectively engageable to establish power flow paths within the transmission; and
   a controller configured to execute control loop cycles at a predetermined cycle time such that each of the control loop cycles has a duration equal to the cycle time, the controller being programmed to, during a boost phase of a shift, command a first hydraulic boost pressure to an oncoming one of the friction elements (oncoming friction element) for a first duration of time equal to a plurality of the control loop cycles and subsequently command a second hydraulic boost pressure less than the first hydraulic boost pressure to the oncoming friction element for a second duration of time including only one of the control loop cycles such that the second duration of time is equal to the cycle time.

2. The vehicle of claim 1, wherein the controller is further programmed to, responsive to the end of the boost phase, commanding a hysteresis pressure to the oncoming friction element.

3. The vehicle of claim 2, wherein the hysteresis pressure is less than the second hydraulic boost pressure.

4. The vehicle of claim 1, wherein the second hydraulic boost pressure is based on a boost time of the boost phase.

5. The vehicle of claim 4, wherein increasing the first hydraulic boost pressure reduces the boost time.

6. The vehicle of claim 5, wherein decreasing the first hydraulic boost pressure increases the boost time.

7. The vehicle of claim 1 further comprising a solenoid in fluid communication with the oncoming friction element and configured to regulate fluid pressure supplied to the oncoming friction element, wherein the first hydraulic boost pressure is commanded to the solenoid and corresponds to a wide-open position of the solenoid.

8. The vehicle of claim 1, wherein the second hydraulic boost pressure is greater than a regulation pressure of the oncoming friction element.

9. The vehicle of claim 1, wherein the transmission further includes a solenoid that regulates hydraulic pressure to the oncoming friction element, wherein commanding the first hydraulic boost pressure further includes commanding a first current to the solenoid, and commanding the second hydraulic boost pressure further includes commanding a second current to the solenoid.

10. A hybrid vehicle comprising:
an engine;
an electric machine;
a disconnect clutch configured to selectively couple the engine to the electric machine; and
a controller configured to execute control loop cycles at a predetermined cycle time such that each of the control loop cycles has a duration equal to the cycle time, the controller being programmed to
responsive to a request to engage the disconnect clutch, sequentially command, during a boost phase of clutch engagement, a first hydraulic boost pressure to the disconnect clutch for a first duration of time equal to a plurality of the control loop cycles and a second hydraulic boost pressure to the disconnect clutch for a second duration of time including only one of the control loop cycles such that the second duration of time is equal to the cycle time, wherein the second hydraulic boost pressure is less than the first hydraulic boost pressure, and
responsive to the end of the boost phase, command a hysteresis pressure to the disconnect clutch.

11. The hybrid vehicle of claim 10, wherein the second hydraulic boost pressure is based on the first hydraulic boost pressure.

12. The hybrid vehicle of claim 10, wherein the controller is further programmed to:
determine an ideal time for the boost phase, and
determine the first duration based on integer division of the ideal time and the cycle time.

13. The hybrid vehicle of claim 12, wherein the second hydraulic boost pressure is based on the first hydraulic boost pressure and a remainder of the integer division.

14. The hybrid vehicle of claim 10, wherein the second hydraulic boost pressure is based on a boost time of the boost phase.

15. The hybrid vehicle of claim 10, wherein the first hydraulic boost pressure has a constant magnitude.

16. A method of controlling hydraulic pressure commanded to a solenoid associated with a friction element of a vehicle, the method comprising:
in response to a request to engage the friction element and being in a boost phase, commanding the solenoid to a wide-open position, that provides fluid to the friction element at a first flow rate, for a plurality of control loop cycles and subsequently commanding the solenoid to another position, that provides the fluid to the friction element at a second flow rate that is less than the first flow rate, for only a single control loop cycle that defines an end of the boost phase.

17. The method of claim 16, wherein the friction element is a transmission friction element.

18. The method of claim 17, wherein the method is performed by a vehicle controller configured to execute the control loop cycles at a predetermined cycle time such that each of the control loop cycles has a duration equal to the cycle time.

19. The method of claim 16, wherein the second flow rate is based on a boost time of the boost phase.

* * * * *